Sept. 29, 1970 L. BLUMKIN 3,531,758

BUS BAR ASSEMBLY

Filed March 27, 1968 3 Sheets-Sheet 1

Inventor

Leon Blumkin

By

Attorney

Inventor
Leon Blumkin
By Alvin Browdy
Attorney

Inventor
Leon Blumkin
By Alvin Browdy
Attorney

United States Patent Office 3,531,758

Patented Sept. 29, 1970

3,531,758

BUS BAR ASSEMBLY

Leon Blumkin, 53 Hanamal St., Haifa, Israel

Filed Mar. 27, 1968, Ser. No. 716,379
Int. Cl. H01r 13/54
U.S. Cl. 339—22 10 Claims

ABSTRACT OF THE DISCLOSURE

A bus bar assembly unit wherein the bus bars are so embedded in one or more insulating blocks that accidental contact therewith is rendered practically impossible. The units can be combined together into composite assemblies and specially designed plugs are provided which can only be inserted into the assembly in the correct sense.

This invention relates to bus bar assemblies.

Known bus bar assemblies include copper or aluminium conductors, generally of rectangular cross-section, such conductors serving as common connections for the various phases of an electrical supply and being located in a region where it is required to connect various devices in the same circuit to the supply.

With known bus bar assemblies a problem arises, on the one hand of adequately safeguarding against accidental contact with the live bus bars whilst, on the other hand, allowing for the simple and ready connection to the assembly of any of the devices in the circuit.

It is an object of the present invention to provide a new and improved bus bar assembly in which the above referred to requirements are substantially fulfilled.

According to the present invention there is provided a bus bar assembly comprising at least two channel-shaped bus bars embedded in at least one insulating block so as to leave open sides of the bars facing each other across an access gap formed in or defined by the block(s).

In use, a plurality of such assemblies can be mounted end to end, provision being made for the mechanical and electrical coupling of adjacent assemblies.

Thus, electrical contact can only be made with the live bus bars via the access gap and through the open sides of the bars. In this way the bars are protected against accidental contact from outside.

The invention furthermore conceives of the provision of a coupling plug having a plurality of contacts corresponding to the number of bus bars in the assembly, each contact being electrically connected to a separate electrical conductor of the plug, the arrangement being such that the plug can be inserted into the assembly and rotated into contact with the bus bars only in a predetermined position and in a predetermined sense.

The invention will now be described by way of example and with reference to the accompanying drawings in which.

Figure 1:
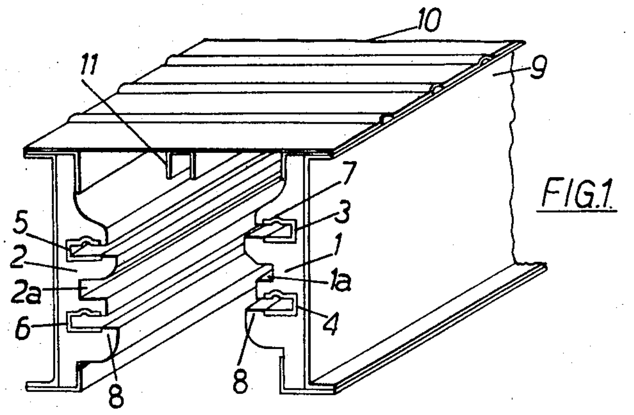
FIG. 1 is a perspective view of a bus bar assembly unit in accordance with the invention.
Figure 7:
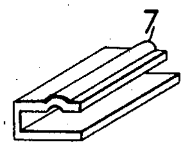
FIGS. 7, 8 and 9 are respective views of various components shown in FIGS. 1 and 6.
Figure 8:
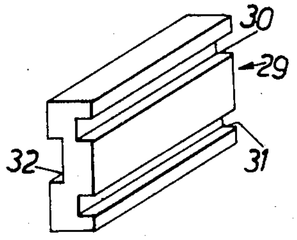
Figure 9:
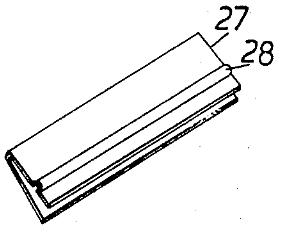
Figure 10:
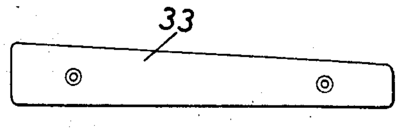
FIGS. 10 and 11 are respective plan and side views of a component shown in FIG. 6.
Figure 11:
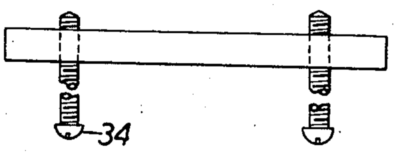

As seen in FIG. 1 of the drawings the bus bar assembly unit comprises a pair of insulating blocks 1 and 2 defining between them an access gap in which are respectively embedded channel-shaped bus bars 3, 4 and 5, 6 (shown clearly in FIG. 7). Longitudinal grooves 1*a* and 2*a* are joined respectively in the blocks 1 and 2 between superimposed bus bars. The upper surface of each bus bar is formed with a longitudinally extending recess 7. As can be seen, the bus bars are so embedded in the respective insulating blocks as to allow for access to and electrical contact with the interior of the bus bars. On the other hand the blocks are provided with lips 8 which effectively shield the external edges of the bus bars from accidental contact therewith.

The two blocks 1 and 2 are securely mounted in the metal casing 9 having a roof portion 10 which includes corrugations 11.

The casing 9 is such as to have an opening extending along the base thereof and two end openings. The casing is furthermore provided with a longitudinally extending, channel-shaped earthed conductor 11 which is electrically connected to the casing 9 and depends downwardly from the roof portion 10.

As can be seen in FIG. 1 of the drawings the bus bars 5 and 6 are vertically offset with respect to the bus bars 3 and 4.

Means (not shown) are provided for suspending the assembly unit from a ceiling or the like.

Figure 2:
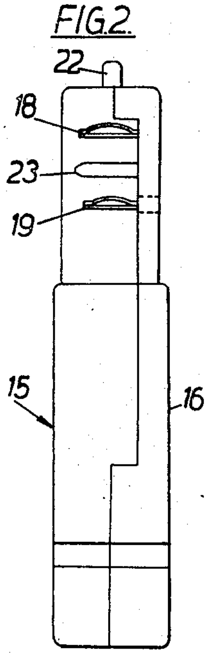
FIG. 2 is a side elevation of a connector plug for use with the bus bar assembly unit in accordance with the invention.
Figure 3:
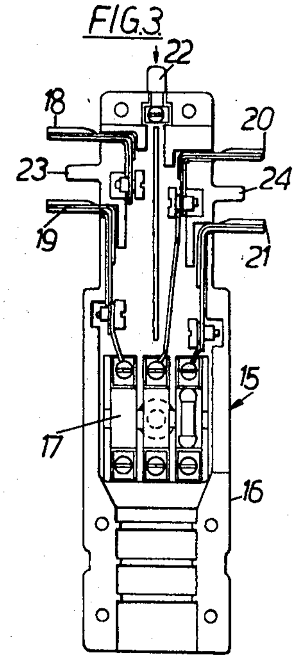
FIG. 3 is a front elevation of the plug shown in FIG. 2 with its cover removed.

FIGS. 2 and 3 show a connecting plug 15 for use with a bus bar assembly unit as described above. This plug 15 is constituted by an insulating body 16 through which pass a plurality of conductors (not shown) respectively connected via fuses 17 to separate metallic contacts 18–21 which project out of the body 15. The plug 15 terminates in an earthed contact 22. The body is furthermore provided with a pair of diametrically opposite wings 23 and 24 which project out of the body 21.

Figure 4:
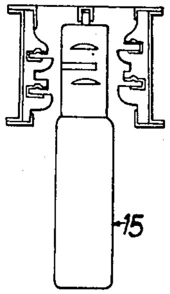
FIGS. 4 and 5 show respectively two stages in the introduction of the plug into the bus bar assembly.
Figure 5:
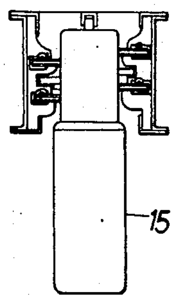

In use, when it is desired to make contact with the bus bars at a particular location of the assembly the plug 15 is inserted into the assembly through the base aperture thereof with the contacts and wings 23 directed along a direction parallel to the longitudinal extent of the bus bars. In this position the earthed contact 22 is introduced into the earthed conductor 12 and now, if the plug is turned round in a given sense the contacts 18–21 will enter the appropriate bus bars 3–6, and the wings 23 and 24 will enter the longitudinal grooves 1*a* and 2*a* respectively. The insertion and rotation of the plug are respectively shown in FIGS. 4 and 5 of the drawings. Any attempt to rotate the plug 15 in the opposite sense will be prevented in view of the abutment of the wings 23 and 24 of the plug 15 on the external surfaces of the insulating blocks 1 and 2. In this way, and also by virtue of the fact that the bus bars of the two blocks are respectively offset in the vertical direction, it can be ensured that under no circumstances do the contacts of the plug enter in appropriate bus bars. In addition to the function of the wings 23 and 24 in preventing incorrect insertion of the plug 15 into the unit, they also serve to ensure adequate mechanical support for the plug in the unit, seeing that the weight of the plug will now be borne by the wings and the insulating blocks and not merely by the contacts.

A plurality of assembly units such as shown in FIG. 1 of the drawings can be coupled together so as to constitute a composite elongated bus bar assembly. For this purpose it is necessary to effect both the electrical and mechanical coupling of adjacent assembly units and the means for doing so are illustrated in FIGS. 6–11 of the drawings.

Figure 6:
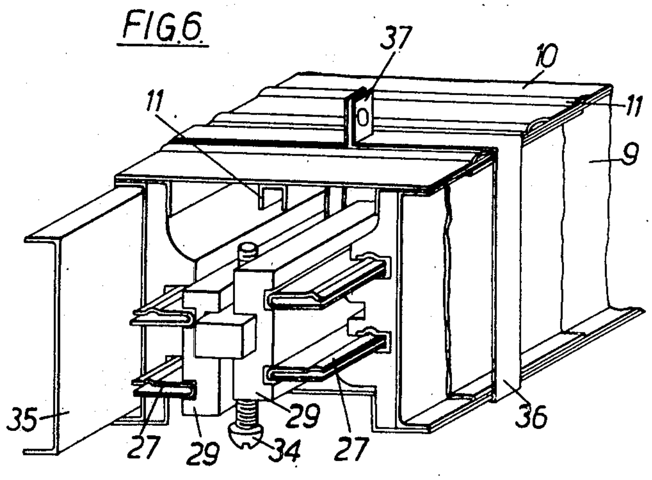
FIG. 6 is a perspective view of a bus bar assembly unit provided with connecting means for use in connecting the unit to an adjacent unit.

As seen in FIG. 6 of the drawings a bus bar assembly unit is shown already fitted with all the elements with which mechanical and electrical coupling is to be effected vis-a-vis an adjoining unit which (for the sake of clarity) is not shown. Electrical contact between adjoining units is effected by means of elongated conductor clips 27 having formed on an upper elongated surface thereof a protruding rib 28. Thus, when each clip 27 is inserted into a corresponding bus bar the rib 28 is located in the corresponding recess 7 in the bus bar and in this way the clip 27 is retained in position. A pair of locating blocks 29 (shown clearly in FIG. 8 of the drawings) are then employed to ensure correct location and insulation of the clips. Each block is provided with a pair of spaced elongated grooves 30 and 31, and on an opposite face thereof with a relatively wider elongated groove 32. The two blocks 29 are inserted in position within the two adjoining units so that the ends of the clips 27 are respectively located in the grooves 30 and 31 whilst the wider grooves 32 of the two blocks are located opposite one another and ready to receive an elongated wedge shaped member 33 (shown clearly in FIGS. 10 and 11 of the drawings).

The insertion of the wedge shaped member 33 results in the blocks 29 being firmly pushed outwardly thereby clamping in position the conducting clips 27 in their respective bus bars. With the wedge shaped member 33 clamped in position, bolts 34 are screwed through the wedge shaped member 33, the bolt ends being arranged to clamp against the earthed conductor.

Prior to the establishment of effective electrical contact between adjoining units, the mechanical coupling is effected by the insertion of bridging side wall elements 35 which are arranged to be held firmly in position, bridging adjoining units, by means coupling straps 36 provided with suspension lugs 37 allowing also for the suspension of the combined units from a ceiling or the like.

Figure 12:
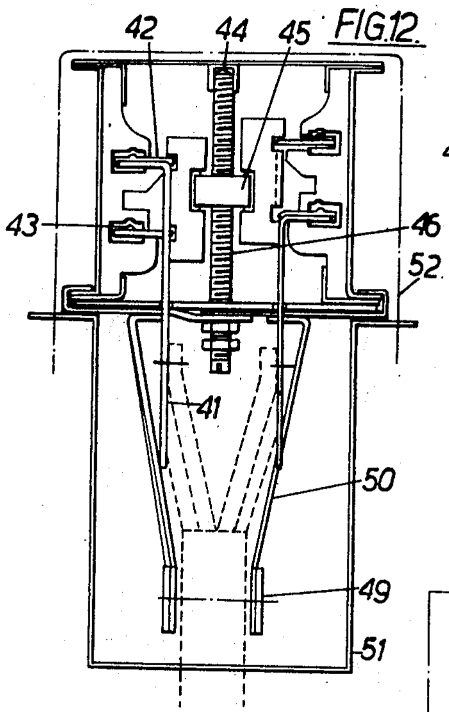
FIG. 12 is a sectional elevation of the assembly unit shown in FIG. 1 with a power feed-in unit shown in operative position.
Figure 13:
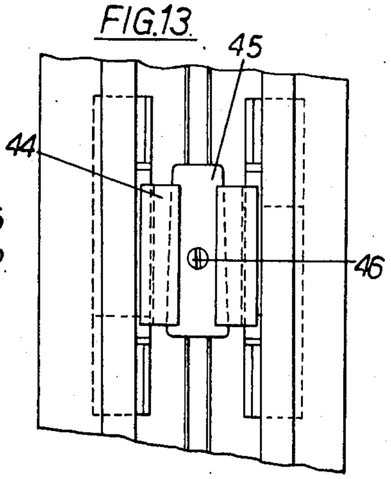
FIG. 13 is a plan view from below of the combined units shown in FIG. 12 with end plate and contacts removed.
Figure 14:
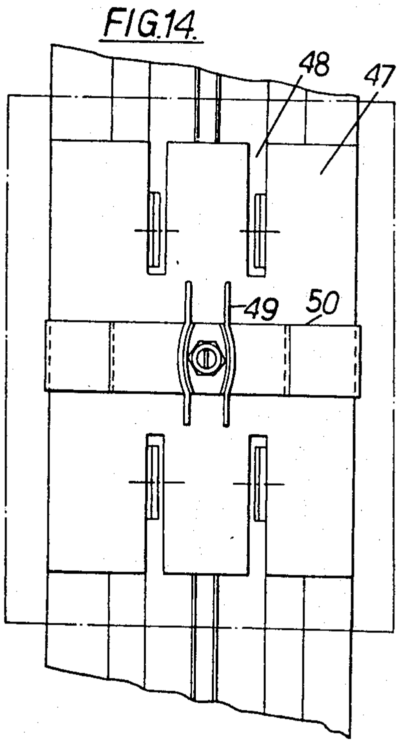
FIG. 14 is a plan view from below of the combined units shown in FIG. 12 showing end plates and contacts.
Figure 15:
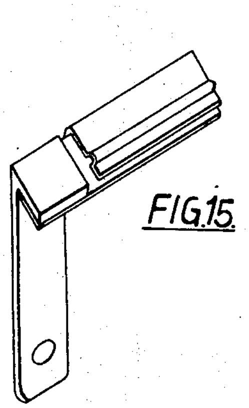
FIG. 15 is a perspective view of a contact terminal shown in FIG. 12.

Reference will now be made to FIGS. 12 to 14 of the drawings in which is illustrated a power input unit for the bus bar assembly described above. The unit comprises four terminal strips 41 each of which is provided with an elongated terminal contact bar 42, having an elongated rib portion 45. The contact bars 42 are inserted in the respective bus bars and are retained in position by the engagement of the rib portions 43 with the elongated recesses 7. In turn the contact bars and terminal strips are firmly clamped in position by means of locating blocks 44, wedge shaped member 45 and bolt 46 which are substantially identical with the corresponding members 29, 33 and 34, described with reference to FIGS. 6 to 11 of the drawings.

An end plate 47, shown clearly in FIG. 14 of the drawings, is located at the base of the bus bar unit. This end plate 47 is provided with four slots 48 through which extend the terminal strips 41. The bolt 46 extends through an appropriate aperture formed in the end plate 47. A two piece cable clamping collar 49 is secured to the end plate by straps 50, one flanged end of each strap 50 being firmly secured to the bolt 46, whilst the other flanged end of each strap 50 being bent over to grip the flanged ends of the casing of the bus bar unit thereby also securing in position the end plate 47.

The input unit is completed by means of a housing 51 which surrounds the cable clamping collars 49 and straps 50 and is provided at its upper end with outwardly extending flanges facilitating the clamping of the housing 51 to the casing by means of straps 52 shown in chain dotted lines.

The input supply cables (shown in chain dotted lines) are introduced through the housing 51 and form electrical contact with the terminal strips 41.

The construction of this input unit which has just been described is such as to allow for power input to the bus bar assembly at any appropriate and convenient position. Similarly the construction of the take-off plug is such that take-off can also be effected at any convenient position along the bus bar assembly.

It will be readily seen that the construction of the bus bar assembly as described above and the connecting plug ensures a safe and efficient arrangement, which, on the one hand practically removes the danger of accidental contact with the bus bars and on the other hand facilitates the ready connection of the plug to the bus bars but only in the correct sense.

Furthermore by virtue of the particular construction of the insulating blocks in which the bus bars are located, accidental contact with the bus bars by a rod projecting into the casing enclosure is virtually impossible as entry into the bus bars and contact therewith can only take place by means of a displacement in a direction normal to the longitudinal extent of the bus bars.

The bus bars can conveniently be formed of copper or aluminium whilst the insulating blocks in which they are embedded can, for example, be formed of PVC or other suitable insulating material.

Alternatively the blocks can be formed integrally with the casing from a plastic material.

The particular construction of the assembly and the plug allows for the selective association of an assembly relating, for example, to a particular voltage, with a particular plug. The number and disposition of wings on this plug are chosen to ensure that only the correct plug is inserted in the appropriate assembly.

I claim:

1. A bus bar assembly comprising a plurality of bus bar assembly units adjacent one another and mechanically and electrically coupled together, each said unit comprising at least two channel shaped bus bars each having two limbs and a connecting side with the fourth side open to define said channel shape, said channel shaped bus bars being embedded in at least one insulating block with the open sides of said bars facing in respectively opposite directions and generally toward one another and separated by an access gap, electrically conductive clips extending into adjacent bars of adjacent units and serving to effect said electrical coupling, and means for securing said clips in position.

2. A bus bar assembly according to claim 1, wherein said securing means comprises retaining blocks which are wedged apart so as to push said clips into said bars by means of a wedge shaped member.

3. A bus bar assembly according to claim 1, wherein said at least one insulating block is mounted in a metal casing, which, in turn, is adapted to be mounted so that access thereto via said access gas is from below.

4. A bus bar assembly according to claim 1, wherein said insulating block is formed integrally with an insulating casing.

5. A bus bar assembly according to claim 1, wherein said insulating block is provided with insulating lips which shield the edges of the bus bars.

6. A bus bar assembly according to claim 5, wherein said insulating block is formed with a longitudinal groove separating adjacent embedded bus bars.

7. A bus bar assembly according to claim 1, wherein each said bus bar is formed with a longitudinal groove in one of its limbs and each clip is formed with a longitudinally directed rib arranged to be located in a corresponding groove of a bus bar.

8. For use with a composite bus bar assembly according to claim 7, a power input unit comprising a plurality of ribbed conductor clips insertable into the bus bars, each strip being formed integrally with a terminal tag, the strips being firmly held in position by means of their ribs and by locating blocks which are wedged apart by means of a wedge shaped member.

9. A bus bar assembly comprising a plurality of bus bar assembly units mechanically and electrically coupled together, each unit comprising at least two channel shaped bus bars embedded in at least one insulating block so as to leave open sides of the bars facing in opposite directions and separated by an access gap, the bars on one side of the access gap being staggered with respect to the bars on the other side of the access gap, each block being formed with a longitudinal groove separating adjacent bus bars, electrically conductive clips inserted in adjacent bars of adjacent units and serving to effect said electrical coupling and securing means for securing said clips in position.

10. For use with a bus bar assembly according to claim 9, a connector plus comprising an insulator body, two sets of exposed metallic contacts projecting from respective opposite sides of the body and being respectively staggered with respect to each other and connected to electrical conductors, and a pair of stop members respectively projecting from said opposite sides, each member being located between a pair of metallic contacts.

References Cited

UNITED STATES PATENTS

| | | | |
|---|---|---|---|
| 2,318,859 | 5/1943 | Huguelet | 248—68 |
| 2,626,298 | 1/1953 | Hammerly. | |
| 2,659,874 | 11/1953 | Veitch | 339—76 |
| 3,042,761 | 7/1962 | Mayer | 191—59.1 |
| 3,295,093 | 12/1966 | Neumann et al. | 339—21 |
| 3,358,267 | 12/1967 | Henderson | 339—217 |

FOREIGN PATENTS

| | | |
|---|---|---|
| 1,282,113 | 12/1961 | France. |

MARVIN A. CHAMPION, Primary Examiner

J. H. McGLYNN, Assistant Examiner

U.S. Cl. X.R.

174—88, 99; 339—75, 221